United States Patent
Chang et al.

(10) Patent No.: US 11,068,031 B2
(45) Date of Patent: Jul. 20, 2021

(54) STAND ASSEMBLIES

(71) Applicant: HEWLETT-PACKARD DEVELOPMENT COMPANY, L.P., Spring, TX (US)

(72) Inventors: Keng-Ming Chang, Taipei (TW); Hsin-Tsung Ho, Taipei (TW); Chi-Chun Chiang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/771,187

(22) PCT Filed: Mar. 13, 2018

(86) PCT No.: PCT/US2018/022085
§ 371 (c)(1),
(2) Date: Jun. 9, 2020

(87) PCT Pub. No.: WO2019/177584
PCT Pub. Date: Sep. 19, 2019

(65) Prior Publication Data
US 2021/0173433 A1    Jun. 10, 2021

(51) Int. Cl.
*G06F 1/16* (2006.01)

(52) U.S. Cl.
CPC ............ *G06F 1/166* (2013.01); *G06F 1/1616* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,175,672 A | * | 12/1992 | Conner | G06F 1/1616 235/145 R |
| 5,247,285 A | * | 9/1993 | Yokota | E05C 1/10 248/919 |
| 5,646,818 A | * | 7/1997 | Hahn | G06F 1/1616 361/679.09 |
| 6,666,422 B1 | * | 12/2003 | Lu | G06F 1/1616 16/340 |
| 8,081,446 B2 | * | 12/2011 | Hsu | G06F 1/1616 361/679.55 |
| 8,208,249 B2 | * | 6/2012 | Chin | G06F 1/1677 361/679.27 |

(Continued)

FOREIGN PATENT DOCUMENTS

| CN | 204763948 | 11/2015 |
|---|---|---|
| CN | 205640076 | 10/2016 |

*Primary Examiner* — Lisa Lea-Edmonds
(74) *Attorney, Agent, or Firm* — HPI Patent Department

(57) ABSTRACT

An example stand assembly is described, which may include a first support feature extending from a rear end of a first housing of an electronic device and a second support feature extending from a rear end of a second housing of the electronic device. The first housing and the second housing may be rotatable relative to one another between an open position and a closed position of the electronic device. The first support feature may have a first curved shape. The second support feature may have a second curved shape in a direction opposite to the first curved shape. The first support feature and the second support feature may facilitate the electronic device to stand vertically in the closed position.

15 Claims, 4 Drawing Sheets

(56) References Cited

U.S. PATENT DOCUMENTS

| | | | |
|---|---|---|---|
| 8,379,378 B2 | 2/2013 | Visser et al. | |
| 9,227,763 B2* | 1/2016 | Gengler | G06F 1/16 |
| 9,348,369 B2 | 5/2016 | Kee et al. | |
| 9,529,384 B1* | 12/2016 | Liang | G06F 1/1616 |
| 9,582,048 B2* | 2/2017 | Ho | G06F 1/1681 |
| 9,740,253 B2* | 8/2017 | Cheng | G06F 1/1616 |
| 9,983,636 B2* | 5/2018 | Ho | E05F 1/00 |
| 10,289,164 B2* | 5/2019 | Seo | G06F 1/166 |
| 2006/0262497 A1 | 11/2006 | Jahlokov | |
| 2008/0142653 A1 | 6/2008 | Lai et al. | |
| 2013/0308263 A1 | 11/2013 | Dondurur | |

\* cited by examiner

STAND ASSEMBLIES

BACKGROUND

The emergence and popularity of mobile computing has made portable electronic devices, due to their compact design and light weight, a staple in today's marketplace. Within the mobile computing realm, electronic devices such as notebook computers, laptops, mobile phones, personal digital assistants, and the like may be widely used and may employ a clamshell-type design consisting of two housings connected at a common end via hinges. For example, a first or display housing is utilized to provide a viewable display while a second or base housing includes an area for interface components (e.g., a keyboard, a touch pad, and other input devices).

BRIEF DESCRIPTION OF THE DRAWINGS

Examples are described in the following detailed description and in reference to the drawings, in which.

DETAILED DESCRIPTION

Electronic devices may employ a clamshell-type design with two housings connected at a common end via hinges. The two housings can be rotatable relative to one another between an open position and a closed position. For example, a first or display housing may house a display (e.g., a liquid crystal display (LCD)) and a second or base housing may house interface components (e.g., a keyboard, a touch pad, and other input devices). Further, the hinges may rotatably couple the first or display housing with the second or base housing. In some examples, it may be convenient to vertically stand and support the electronic devices on a flat surface, such as a desk, by configuring the electronic devices in a folded state (e.g., the closed position). However, for the electronic devices to stand in the folded state, a separate stand or rest (e.g., a tripod, docking station, and the like) may be needed.

Examples described herein may provide a stand assembly for an electronic device, which may enable the electronic device to stand vertically on a flat surface (e.g., a table) for space saving while allowing a pivot movement between a first housing and a second housing. Examples described herein may save table space when not using the electronic device, which can allow to perform some other tasks such as a paper work. Examples described herein may elevate the base housing when the electronic device is in the open position, which can provide a comfortable hand position and reduce stress during typing.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

Examples described herein may provide a stand assembly for an electronic device. The electronic device may include a first housing and a second housing pivotally connected to the first housing. The first housing and the second housing can be rotatable relative to one another between an open position and a closed position of the electronic device. The stand assembly may include a first support feature extending from a rear end of the first housing and a second support feature extending from a rear end of the second housing. The first support feature may have a first curved shape. The second support feature may have a second curved shape in a direction opposite to the first curved shape. The first support feature and the second support feature may facilitate the electronic device to stand vertically (e.g., on a flat surface) in the closed position.

Figure 1:
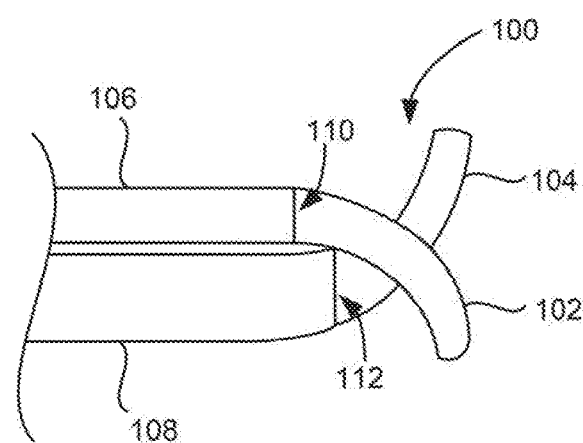
FIG. 1 is a side view of an example stand assembly to support an electronic device to stand vertically in a closed position.

Turning now to the figures, FIG. 1 is a side view of an example stand assembly 100 to support an electronic device to stand vertically in a closed position. Example electronic device may include a notebook, a tablet, a personal computer (PC), a smart phone, a personal digital assistant, or any other device having two housings pivotally connected to each other. In one example, the electronic device may employ a clamshell-type design with two housings (e.g., a first housing 106 and a second housing 108) rotatably connected via hinges.

In one example, first housing 106 and second housing 108 can be rotatable relative to one another between an open position and the closed position of the electronic device. The term "closed position" may refer to a configuration in which the display screen is facing the keyboard and the two are parallel. The term "open position" may refer to a configuration in which the display screen and the keyboard are not parallel and are available for user access.

Stand assembly 100 may include a first support feature 102 extending from a rear end 110 of first housing 106. First support feature 102 may have a first curved shape. In one example, second housing 108 may be pivotally connected to first housing 106 at first support feature 102. Further, stand assembly 100 may include a second support feature 104 extending from a rear end 112 of second housing 108. In one example, second support feature 104 may have a second curved shape in a direction opposite to the first curved shape. For example, the second curved shape may have a curve in the direction opposite to a curve of the first curved shape.

Figure 5A:
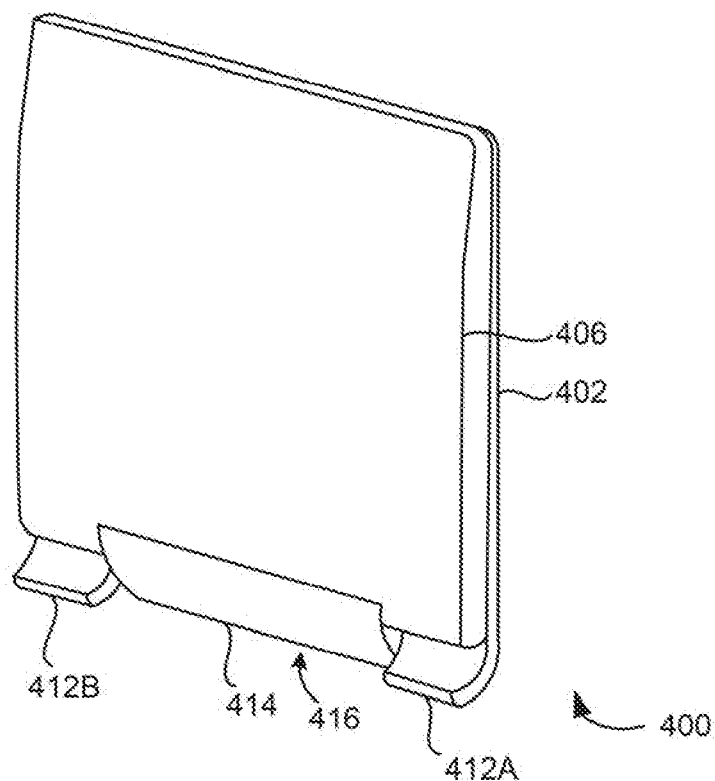
FIG. 5A is a back view of the example electronic device of FIG. 4, depicting the electronic device standing in the vertical position.
Figure 5B:
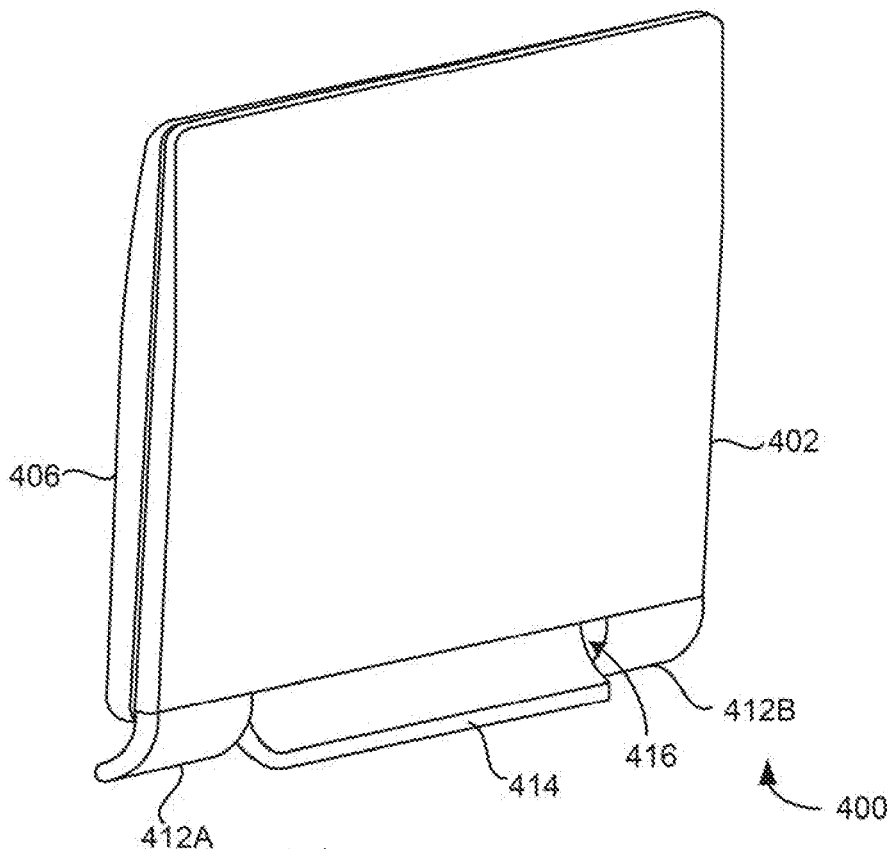
FIG. 5B is a front view of the example electronic device of FIG. 4, depicting the electronic device standing in the vertical position.

In one example, first support feature 102 and second support feature 104 may form an X-shape in the closed position. First support feature 102 and second support feature 104 may facilitate the electronic device to stand vertically in the closed position (e.g., as shown in FIGS. 5A and 5B). In another example, first support feature 102 may fold under second housing 108 and second support feature 104 may fold into an opening defined at rear end 110 of first housing 106 when the electronic device is in the open position.

Figure 2:
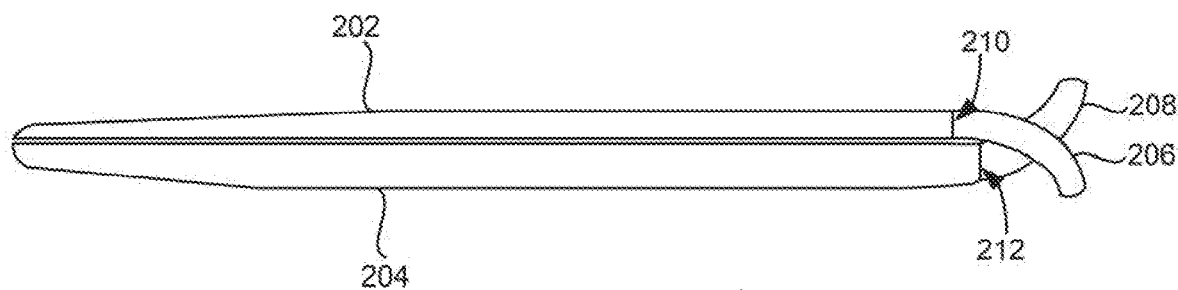
FIG. 2 is a side view an example device housing in a closed position, depicting a first support feature and a second support feature to support the device housing to stand in a vertical position.

FIG. 2 is a side view an example device housing 200 in a closed position, depicting a first support feature 206 and a second support feature 208 to support device housing 200 to stand in a vertical position. Example device housing 200 may include a housing of a computing device (e.g., a notebook, a tablet, a smart phone, or the like), a healthcare device, or any other device employing a clamshell-type design.

Device housing 200 may include a first housing 202 and a second housing 204 pivotally connected to first housing 202, for instance, via a hinge assembly at a common end. In one example, first housing 202 may be a display housing and second housing 204 may be a base housing (e.g., a keyboard housing). In another example, first housing 202 may be a base housing and second housing 204 may be a display housing.

First housing 202 may include first support feature 206 having a curved shape and protruding from a rear end 210 of first housing 202 at the common end. In one example, first support feature 206 may be removably coupled to rear end 210 of first housing 202. In another example, first support feature 206 may be formed as a part of first housing 202, i.e., first support feature 206 and first housing 202 may be formed as a single-piece structure.

Second housing 204 may include second support feature 208 protruding from a rear end 212 of second housing 204 at the common end. Second support feature 208 may have a curved shape that expends into an opening defined in first support feature 206. In one example, second support feature 208 may be removably coupled to rear end 212 of second housing 204. In another example, second support feature 208 may be formed as a part of second housing 204, i.e., second support feature 208 and second housing 204 may be formed as a single-piece structure.

Figure 3A:
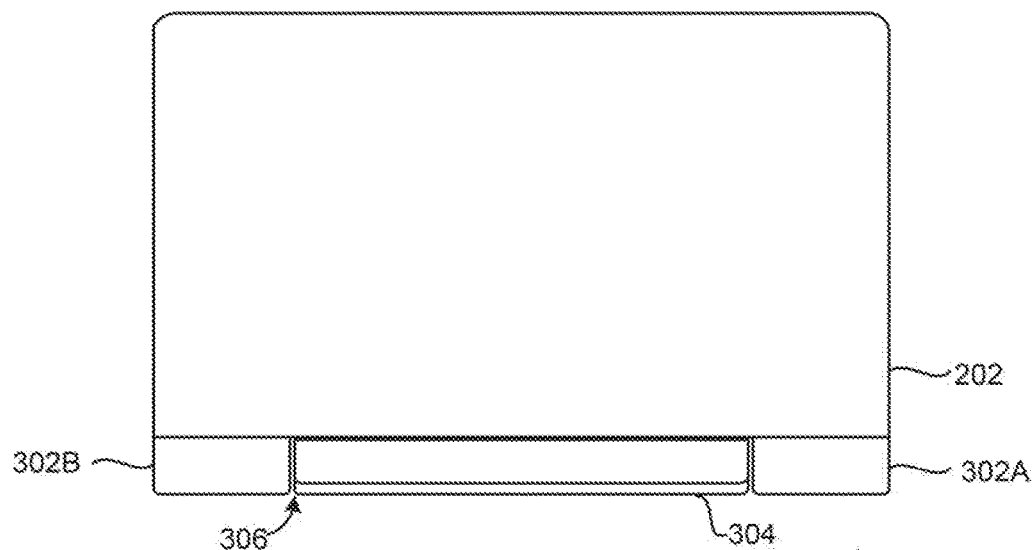
FIG. 3A is a front view of the example device housing of FIG. 2, depicting the device housing standing in the vertical position.

In one example, first support feature 206 and second support feature 208 may support device housing 200 to stand in the vertical position (e.g., as shown in FIG. 3A). In some examples, second housing 204 may be pivotally connected to first housing 202 at first support feature 206 of first housing 202, i.e., first support feature 206 may be pivotally connected to second housing 204. In other examples, first support feature 206 may fold under second housing 204 to elevate second housing 204 at the common end when first housing 202 is in an open position relative to second housing 204.

Figure 3B:
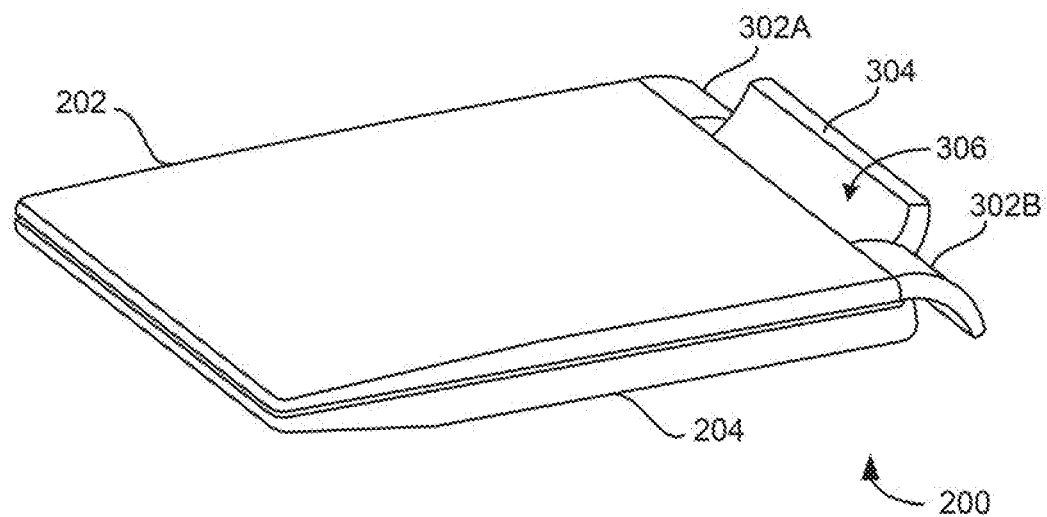
FIG. 3B is a perspective view of the example device housing of FIG. 2.

FIG. 3A is a front view of example device housing 200 of FIG. 2, depicting device housing 200 standing in the vertical position. FIG. 3B is a perspective view of example device housing 200 of FIG. 2. For example, similarly named elements of FIGS. 3A and 3B may be similar in structure and/or function to elements described with respect to FIG. 2. In one example, first support feature (e.g., first support, feature 206 as shown in FIG. 2) may include a first leg 302A and a second leg 302B protruding from sides of the rear end of first housing 202. First leg 302A and second leg 302B may define an opening 306 therebetween. In another example, second support feature (e.g., second support feature 208 as shown in FIG. 2) may include a third leg 304 protruding from a center of the rear end of second housing 204. For example, first leg 302A, second leg 302B, and third leg 304 may have the curved shape. Furthermore, as shown in FIGS. 3A and 3B, third leg 304 may extend into opening 306 defined between first leg 302A and second leg 302B.

Figure 4:
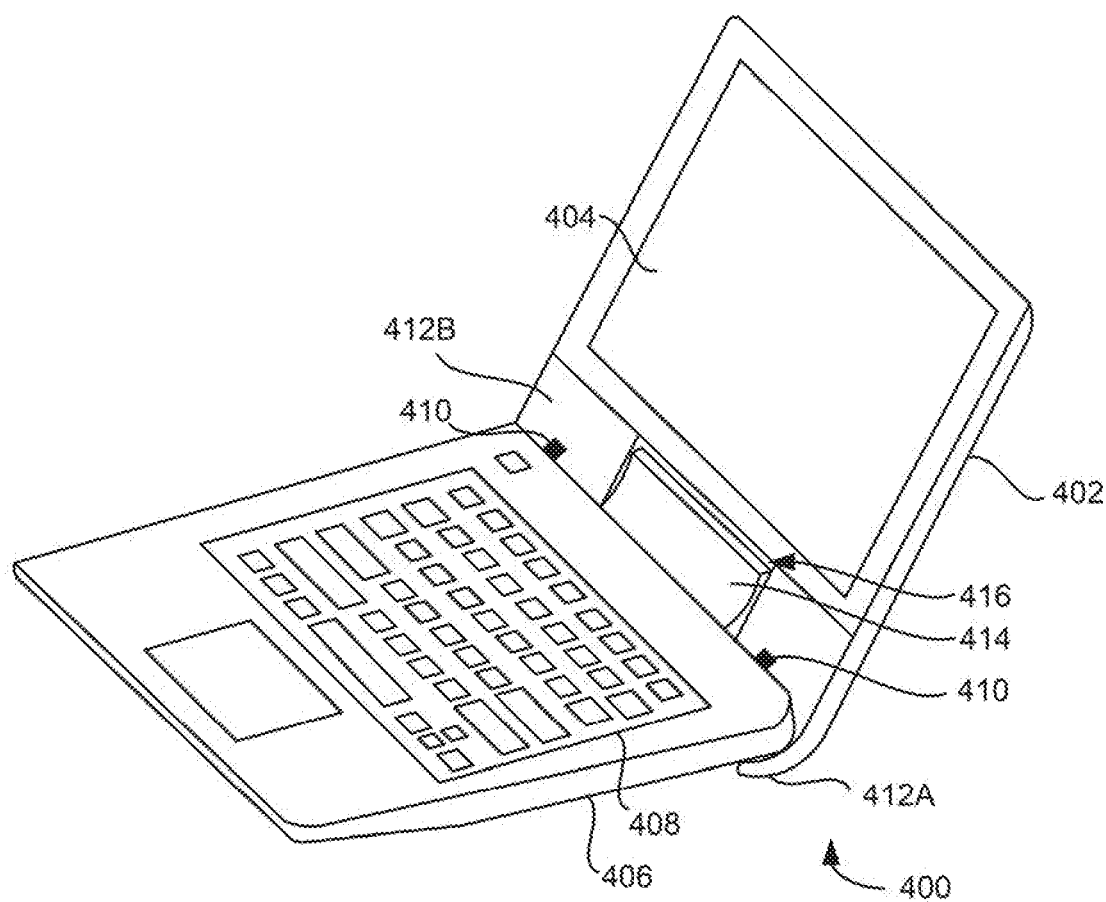
FIG. 4 is a perspective view of an example electronic device in an open position, depicting a first leg, a second leg, and a third leg to support the electronic device to stand in a vertical position.

FIG. 4 is a perspective view of an example electronic device 400 in an open position, depicting a first leg 412A, a second leg 412B, and a third leg 414 to support electronic device 400 to stand vertically. Electronic device 400 may include a display housing 402 to house a display 404, a keyboard housing 406 to house a keyboard 408, and a hinge assembly 410 to pivotally couple display housing 402 and keyboard housing 406 along an axis at a common end.

In one example, display housing 402 and a keyboard housing 406 can be rotatable relative to one another between a closed position and the open position in a range of about 0 to 135 degrees. The term "open position" may refer to a configuration in which display 404 and keyboard 408 are not parallel and are available for user access. The term "closed position" may refer to a configuration in which display 404 is facing keyboard 408 and the two are parallel.

In one example, display housing 402 may be rotatably or detachably connected to keyboard housing 406. Display housing 402 may house display 404 (e.g., a touchscreen display). Example display 404 may include liquid crystal display (LCD), light emitting diode (LED) display, electroluminescent (EL) display, or the like. Keyboard housing 406 may house keyboard 408, touchpad, battery, and the like. Electronic device 400 may also be equipped with other components such as a camera, audio/video devices, and the like depending on the functions of electronic device 400.

Further, electronic device 400 may include first leg 412A and second leg 412B protruding from a rear end (i.e., at the common end) of display housing 402. For example, first leg 412A and second leg 412B may protrude from sides of the rear end of display housing 402. As shown in FIG. 4, hinge assembly 410 may pivotally couple display housing 402 and keyboard housing 406 via first leg 412A and second leg 412B. In one example, first leg 412A and second leg 412B may have a first curved shape.

Furthermore, electronic device 400 may include third leg 414 protruding from a rear end (i.e., at the common end) of keyboard housing 406 and extend into an opening 416 defined between first leg 412A and second leg 412B. For example, third leg 414 may protrude from a center of the rear end of keyboard housing 406. In one example, third leg 414 may have a second curved shape in a direction opposite to the first curved shape. First leg 412A, second leg 412B, and third leg 414 may support electronic device 400 to stand in a vertical position. In some examples, first leg 412A and second leg 412B may fold under keyboard housing 406 to elevate keyboard housing 406 at the common end when display housing 402 is in an open position relative to keyboard housing 406.

FIG. 5A is a back view of example electronic device 400 of FIG. 4, depicting electronic device 400 standing in the vertical position. FIG. 5B is a front view of example electronic device 400 of FIG. 4, depicting electronic device 400 standing in the vertical position. For example, similarly named elements of FIGS. 5A and 5B may be similar in structure and/or function to elements described with respect to FIG. 4.

As shown in FIGS. 5A and 5B, first leg 412A and second leg 412B may form an X-shape with third leg 414 when display housing 402 is in a closed position relative to keyboard housing 406. For example, first leg 412A and second leg 412B may have the first curved shape in a direction towards keyboard housing 406. Further, third leg 414 may have the second curved shape in a direction towards display housing 402 and cross the first curved shape to form the X-shape.

Figure 5C:
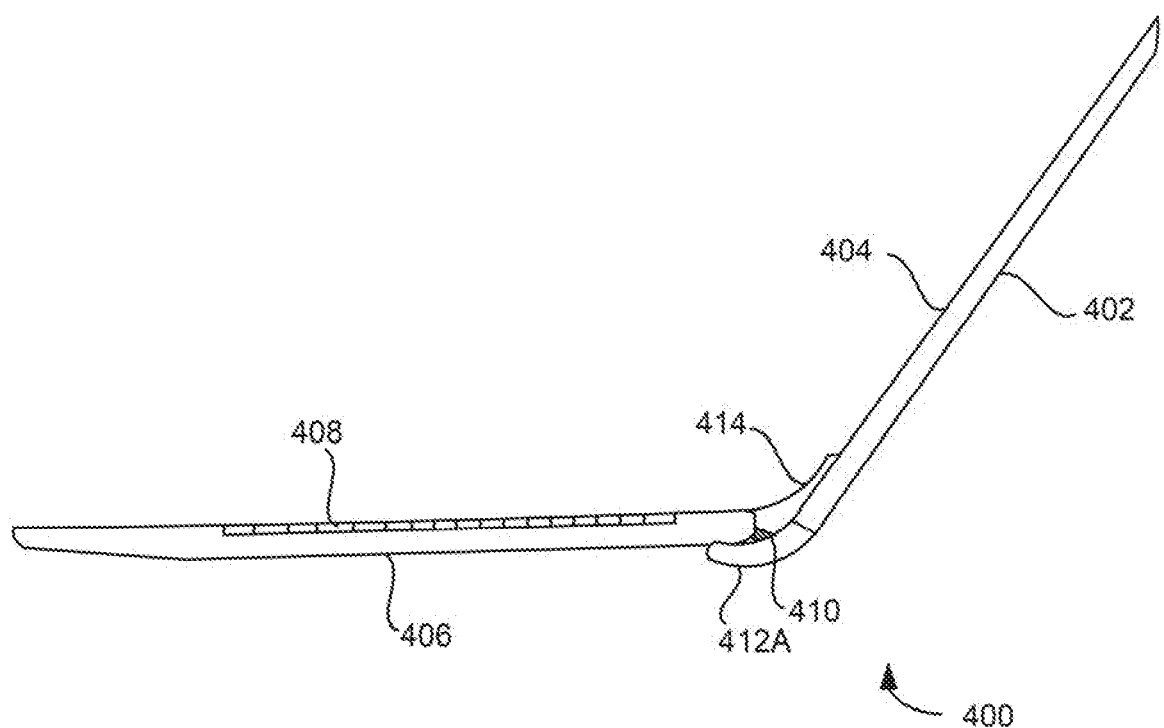
FIG. 5C is a side view of the example electronic device of FIG. 4 in the open position, depicting the first leg that may fold under a keyboard housing and the third leg that may fold into an opening.

FIG. 5C is a side view of example electronic device 400 of FIG. 4 in the open position, depicting first leg 412A that may fold under keyboard housing 406 and third leg 414 that may fold into an opening. In one example, first leg 412A and second leg (e.g., second leg 412B as shown in FIGS. 4, 5A and 5B) may fold under keyboard housing 406 in the open position to elevate keyboard housing 406. Further, third leg 414 may fold into the opening (e.g., opening 416 of FIG. 4) defined at the rear end of display housing 402 to allow display housing 402 to rotate up to about 135 degrees relative to keyboard housing 406.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract, and drawings), and/or all of the steps of any method or process so disclosed, may be combined in any combination, except combinations where at least some of such feature and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A stand assembly comprising:
a first support feature extending from a rear end of a first housing of an electronic device, wherein the first support feature has a first curved shape; and
a second support feature extending from a rear end of a second housing of the electronic device, wherein the first housing and the second housing are rotatable relative to one another between an open position and a closed position of the electronic device, wherein the second support feature has a second curved shape in a direction opposite to the first curved shape, and wherein the first support feature and the second support feature are to facilitate the electronic device to stand vertically in the closed position.

2. The stand assembly of claim 1, wherein the first support feature and the second support feature are to form an X-shape in the closed position.

3. The stand assembly of claim 1, wherein the first support feature is to fold under the second housing and the second support feature is to fold into an opening defined at the rear end of the first housing when the electronic device is in the open position.

4. The stand assembly of claim 1, wherein the second housing is pivotally connected to the first housing via the first support feature.

5. A device housing comprising:
a first housing; and
a second housing pivotally connected to the first housing via a hinge assembly at a common end, wherein the first housing comprises a first support feature having a curved shape and protruding from a rear end of the first housing at the common end, wherein the second housing comprises a second support feature protruding from a rear end of the second housing at the common end, the second support feature having a curved shape that extends into an opening defined in the first support feature, and wherein the first support feature and the second support feature are to support the device housing to stand in a vertical position.

6. The device housing of claim 5, wherein the first support feature comprises a first leg and a second leg protruding from sides of the rear end of the first housing, and wherein the second support feature comprises a third leg protruding from a center of the rear end of the second housing and extending into the opening defined between the first leg and the second leg.

7. The device housing of claim 5, wherein the second housing is pivotally connected to the first housing via the first support feature.

8. The device housing of claim 5, wherein the first support feature is to fold under the second housing to elevate the second housing at the common end when the first housing is in an open position relative to the second housing.

9. The device housing of claim 5, wherein the first support feature is removably coupled to the rear end of the first housing and the second support feature is removably coupled to the rear end of the second housing.

10. The device housing of claim 5, wherein the first support feature is formed as a part of the first housing and the second support feature is formed as a part of the second housing.

11. An electronic device comprising:
a display housing to house a display;
a keyboard housing to house a keyboard;
a hinge assembly to pivotally couple the display housing and the keyboard housing along an axis;
a first leg and a second leg protruding from a rear end of the display housing; and
a third leg protruding from a rear end of the keyboard housing and extend into an opening defined between the first leg and the second leg, wherein the first leg, the second leg, and the third leg are to support the electronic device to stand in a vertical position.

12. The electronic device of claim 11, wherein the hinge assembly is to pivotally couple the display housing and the keyboard housing via the first leg and the second leg.

13. The electronic device of claim 11, wherein the first leg and the second leg are to form an X-shape with the third leg when the display housing is in a closed position relative to the keyboard housing.

14. The electronic device of claim 11, wherein the first leg and the second leg are to fold under the keyboard housing to elevate the keyboard housing when the display housing is in an open position relative to the keyboard housing.

15. The electronic device of claim 11, wherein the first leg and the second leg have a first curved shape, and wherein the third leg has a second curved shape in a direction opposite to the first curved shape.

* * * * *